(12) United States Patent
Cantini et al.

(10) Patent No.: US 7,219,833 B2
(45) Date of Patent: May 22, 2007

(54) METHOD AND MODULE FOR BLOCKING RESPECTIVELY UNBLOCKING OF MONEY ACCOUNTS

(75) Inventors: Renato Cantini, Belfaux (CH); Karin Busch Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 11/209,139

(22) Filed: Aug. 22, 2005

(65) Prior Publication Data

US 2005/0274793 A1    Dec. 15, 2005

Related U.S. Application Data

(63) Continuation of application No. PCT/EP2004/050181, filed on Feb. 20, 2004.

(30) Foreign Application Priority Data

Feb. 21, 2003    (EP) ................... 03100437

(51) Int. Cl.
*G06K 5/00*    (2006.01)
(52) U.S. Cl. ..................... 235/379; 235/380
(58) Field of Classification Search ............... 235/383, 235/382, 454, 380, 379, 492; 705/1, 30, 705/39, 26, 40; 379/88.17, 88.25, 88.04, 379/114.02
See application file for complete search history.

(56) References Cited

U.S. PATENT DOCUMENTS

| | | | | |
|---|---|---|---|---|
| 5,027,388 A | * | 6/1991 | Bradshaw et al. | 379/114.1 |
| 6,212,390 B1 | | 4/2001 | Rune | 455/456.6 |
| 6,529,725 B1 | * | 3/2003 | Joao et al. | 455/406 |
| 6,707,889 B1 | * | 3/2004 | Saylor et al. | 379/88.04 |
| 6,850,916 B1 | * | 2/2005 | Wang | 705/64 |
| 6,991,174 B2 | * | 1/2006 | Zuili | 235/492 |
| 7,050,993 B1 | * | 5/2006 | Piikivi et al. | 705/26 |
| 7,083,090 B2 | * | 8/2006 | Zuili | 235/383 |
| 2002/0107791 A1 | * | 8/2002 | Nobrega et al. | 705/39 |
| 2004/0088232 A1 | * | 5/2004 | Minnis, Jr. | 705/30 |
| 2005/0192897 A1 | * | 9/2005 | Rogers et al. | 705/40 |
| 2005/0278192 A1 | * | 12/2005 | Cantini et al. | 705/1 |

FOREIGN PATENT DOCUMENTS

| | | |
|---|---|---|
| WO | WO 98/37524 | 8/1998 |
| WO | WO 98/47116 | 10/1998 |
| WO | WO 00/31691 | 6/2000 |

* cited by examiner

*Primary Examiner*—Thien M. Le
(74) *Attorney, Agent, or Firm*—Pearne & Gordon LLP

(57) ABSTRACT

Method for blocking respectively unblocking a money account bound to a SIM card (10). The money account is designed for paying services of several providers (2). The money account is blocked respectively unblocked depending on the dynamically determined location of the mobile user.

20 Claims, 2 Drawing Sheets

METHOD AND MODULE FOR BLOCKING RESPECTIVELY UNBLOCKING OF MONEY ACCOUNTS

REFERENCE DATA

This application is a continuation of International Patent Application PCT/EP2004/050181 (WO04075131) filed on Feb. 20, 2004, claiming priority of European patent application EP03100437 of Feb. 21, 2003, the contents whereof are hereby incorporated.

1. Field of the Invention

The present invention concerns a method and a module for blocking respectively unblocking at least one money account bound to an identification module.

2. Description of Related Art

According to the state of the art so far, payment transactions between a customer (user, for example a mobile user) and a provider (for example a trader) are often effected with an electronic payment card. Debit and credit cards are used for example at tills in shops, at petrol stations etc. The card usually comprises memory means (for example a magnetic strip and/or a chip) in which among others the customer's identification is stored. To perform a transaction (for example in order to pay for an article in a shop), the user must insert his card at the trader's in a suitable card reader. The terminal then reads the money account identification (for example the PAN, Primary Account Number) in the card, determines and shows the amount to be paid, if necessary checks the user's solvency and requests that the user confirms the transaction with a confirmation key on the trader's terminal. If the client is solvent and has entered his confirmation, the money account owner identification, the amount to be paid and possibly also a terminal identification are transmitted to a finance server connected with the terminal over a telecommunication network. Accordingly, the user's account at this payment service provider server is debited immediately or later.

Providers more and more often have "virtual terminals" (for example software components) that work together with a money card for payment transactions. In the following description, we will speak of a provider payment module, while this module can be either a physical terminal or a software application.

A difference for card-based payment systems is made between value cards (or electronic money), credit cards and debit cards. In the case of value cards, the payment card usually has a memory area in which (in general previously) a money amount has been loaded (prepaid). The money amount can often also be stored for security reasons in a remote server; in this case, the value card can include merely one identification of the corresponding account in this server. In the case of credit cards, the card is linked to an account of the user with a finance institute, this account being debited only after the transaction (pay later). In the case of debit cards, on the other hand, the linked account with the finance institute must be loaded in advance and is debited during or immediately after the transaction (pay now).

A disadvantage of those methods is the necessity of inserting the user's card into a foreign apparatus. The users normally do not have their card at hand but for example in their wallet; a very fast transaction is therefore not possible.

These cards contain a money account owner identification that only allows the user to be identified with the payment service provider. A card can thus normally be used for a financial transaction only if the user and the provider are affiliated with the same payment service provider. On the other hand, the card is not intended to be used for other kinds of transactions (for example for non-financial transactions). It is thus unavoidable for the user to always own a great number of cards for each kind of financial or non-financial transaction, for example several value cards, debit cards or credit cards that are administered by different finance institutes or chain stores, or subscription cards or access cards for secured areas. These cards are usually protected by different PIN codes which the user must make an effort to memorize. Furthermore, both the users as well as the traders must administer different accounts, which involves for each account studying the general business terms, loading prepaid and value accounts in advance, checking account statements, etc.

In order to avoid these problems, it has been proposed among others in patent application WO98/37524 to use the SIM (Subscriber Identity Module) card for identifying the user in a mobile radio system as an electronic payment card. A contactless connection (for example an infrared connection) between the user mobile device and the provider terminal is established for transmission of the transaction data. The user can thus forgo having to pull out an electronic card from his wallet and inserting it into a foreign apparatus.

From the prior art so far, payment methods are also known wherein the transaction data are transmitted between the user mobile device and a trader terminal not directly but over a payment platform in the mobile radio network. In this case, receipts or a reference for the transaction are transmitted, often over SMS (Short-Message Service) or USSD (Unstructured Supplementary Service Data). These solutions have the advantage that no tedious and security-critical direct connection need be established between the mobile device and the terminal. Furthermore, they also allow transactions between users and providers that are not located in close proximity to one another.

Payment methods in which a single payment card is bound to several money accounts are also known from the prior art so far. In this way, the user can forgo the necessity of having several payment cards with him.

If such a card bound to several accounts is used with a terminal (often also bound to several accounts), the user must determine which money account is to be used for the transaction. If a card is bound for example to a prepaid value account and to several credit and/or debit card accounts, the user can usually decide in a menu in the trader terminal which money account is to be debited. Different parameters can be taken into account, for example the credit standing of each account, the transaction costs, the security, the comfort, etc.

Money cards and in particular identification modules can get lost, be stolen, copied or misused. The commercial success of money cards thus depends strongly on the offered security. Different methods are used to limit the risk of the card owner, of the handler and/or of the payment service provider. In the case of credit and debit accounts, the expenses are mainly limited during a period (often one month) and/or for each transaction. In the case of value accounts, the maximal amount that can be stored is often also restricted. Complicated automatic fraud detection methods can be used by the payment service providers to detect frauds and fraud attempts. Money cards owners and product providers have the possibility to block or unblock suspect or stolen cards. Other mechanisms are provided to restrict the use possibilities of cards in such a manner that the owner suffers the restriction as little as possible but that a potential thief or a fraudster will find it difficult to draw profit from the card. It is for example already known that certain money cards are accepted only in a certain country because no handler or provider accepts these cards abroad as payment means. However, money card owners generally have no possibility to determine themselves when the card should be blocked. Payment service providers have hardly any possibilities to flexibly modify individually for each user or each group of users the geographical area where which money card may be used.

It is an aim of the present invention to propose a new method and a new system that allow the above mentioned disadvantages to be avoided.

It is another aim to propose a new system and method with which the geographical area of use of money cards and money accounts bound to money cards can be restricted independently from the acceptance of the cards by providers or handlers.

It is another aim to propose a method and a system that allow additional services and useful functions.

BRIEF SUMMARY OF THE INVENTION

According to the present invention, these aims are achieved in particular through the elements of the characterizing part of the independent claims. Further advantageous embodiments can furthermore be derived from the dependent claims and the description.

In particular, these aims are achieved through a method for blocking respectively unblocking at least one money account bound to an identification module, wherein the location of the mobile device is determined dynamically and wherein transactions with said money account are blocked respectively unblocked when the mobile device is located in a predefined blocked (respectively unblocked) area.

This has the advantage that money accounts and transactions with money accounts can be blocked or unblocked depending on a dynamically determined location information (instead of on the fixed handler terminal network). In this manner, it can be ensured that a money account can be debited only in a predefined geographical area—even if the provider is prepared to accept the identification module bound to this money account.

Dynamically determining the mobile device location means in this connection that determining the mobile device location requires at least certain computations and is not simply derived from the static, known location of one of the transaction partners. GPS or other satellite location determining methods are dynamic, as are also location determining methods that are based on triangulation methods between signals from several fixed stations in a mobile radio network. Location determining methods based on the time of flight (TOF) and/or on the attenuation of a radio signal to or from the mobile device are dynamic.

If the location is derived merely from the known identity of the mobile device home network or from the location of a fixed terminal used for the transaction by one of the transaction partners, we will not speak in this context of a dynamic location determination.

The location is preferably determined with an accuracy that is considerably finer than the size of the network cells of the mobile radio network. Preferably, location determining means are used with which the mobile device can be located in a wide (for example national) area (for example in the entire supply area of a mobile radio network), provided that the mobile device can be reached by the location determining means.

In a preferred embodiment, blocked or unblocked geographical areas can be set by the money account owner, for example over a website. This allows them to adapt themselves to their needs the geographical area of use of their money accounts.

In a preferred embodiment, blocked or unblocked geographical areas can also be set by the payment service providers. This allows payment service providers to offer money accounts that can be used only in a restricted area—possibly even only in a single shop, a chain of shops, a city, an amusement park etc.—with the possibility of modifying these boundaries dynamically at any time.

Several money accounts can be bound to a single identification module. In a preferred embodiment, other geographic areas of use can be set for these different money accounts. This has the advantage that different security criteria and geographic restrictions can be set for each money account.

In a preferred embodiment, at least certain money accounts are administered from a platform in the infrastructure of the mobile radio network. Transaction data for transactions with several money accounts, that can possibly be offered by several payment service providers and/or several finance institutes, are thus transmitted through a common platform and assessed in this payment platform. This has the advantage that a possible fraud can be detected with a greater certainty since it is possible to monitor the user's behavior with several independent money accounts and since this behavior can be correlated with parameters that are available only in the infrastructure of the mobile radio network. This platform further has the advantage that consolidated invoices and statements of account comprising transaction data with several money accounts can be used for the user and/or for statistical purposes.

In a preferred embodiment, sums of money can be transferred between different money accounts of a user or even between different users, preferably over the common platform. In particular if a provider is simultaneously a mobile user, peer-to-peer money transactions can thus be performed over the payment platform administered by the network operator. This allows for example a prepaid account for which the debit limit has been exceeded to be loaded upon request or even automatically if predefined criteria have been met from another money account of the same or of another user. This also allows money amounts to be transferred from person to person. It is thus also possible to define debit or credit limits for closed groups of users.

Proactive loading means can also be provided for automatically loading value and debit accounts when certain criteria have been met, for example if the balance of an account has reached a bottom threshold.

The different money accounts of a user can be administered by different payment service providers. Each payment service provider can determine their own business terms for the user of their service. The inventive system and method preferably has means for transmitting the business terms to the user to ensure that the user reads these business terms, as well as means for sending a confirmation that these business terms have been accepted.

BRIEF DESCRIPTION OF THE DRAWINGS

The present invention will be better understood with the aid of the description given by way of example and illustrated with the attached figures in which.

DETAILED DESCRIPTION OF POSSIBLE EMBODIMENTS OF THE INVENTION

Figure 1:
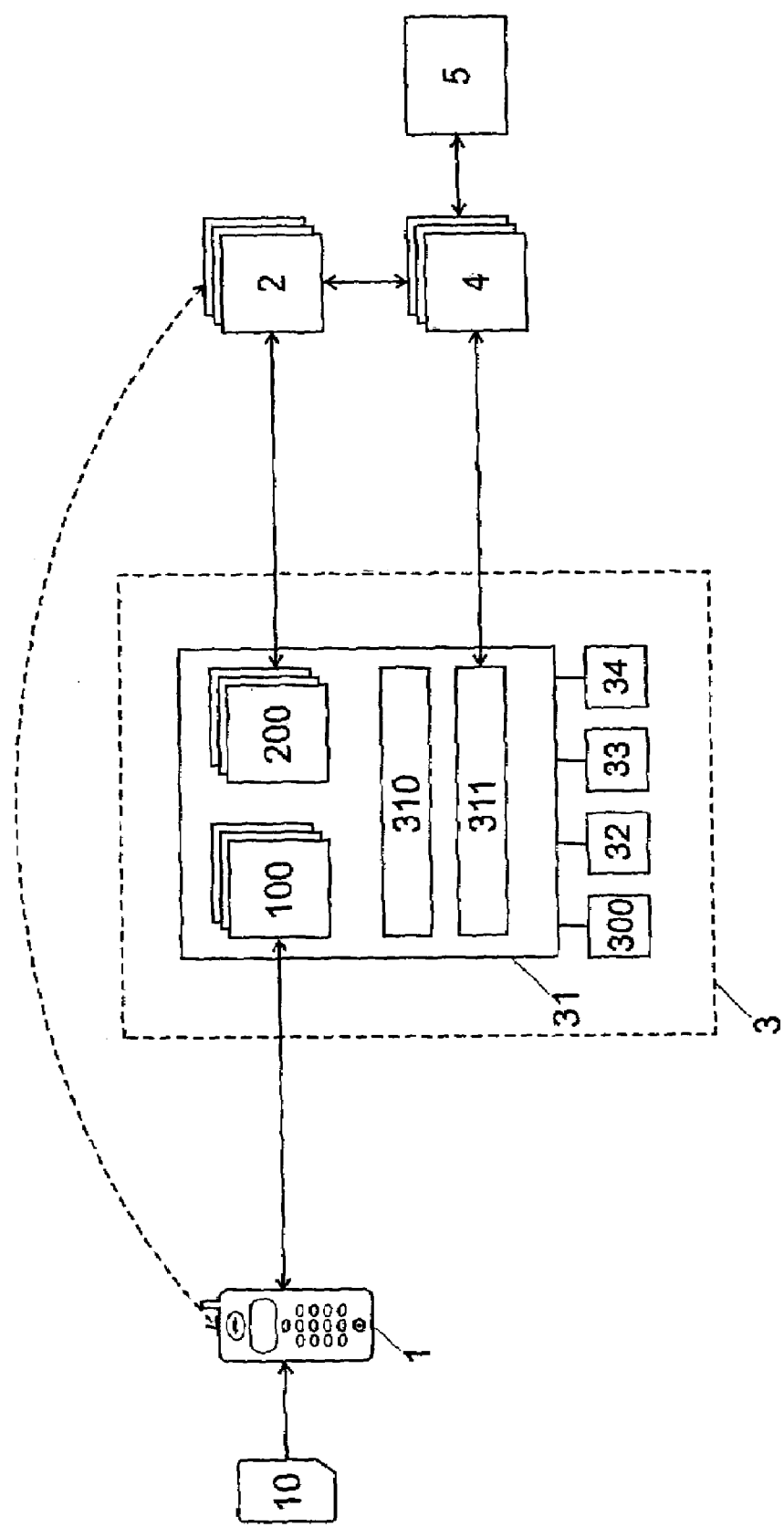
FIG. 1 shows a block diagram illustrating the flow of information in a preferred embodiment of the system of the invention.

FIG. 1 shows a block diagram with the main actors or components of the system. In the represented example, the system includes a plurality of users (mobile users) that each has a mobile device. "Mobile device" in this context means both portable devices as well as apparatus connected to a fixed network but that are identified by an identification module rather than by the point of connection to the network.

In the following description and in the claims, the reference sign 1 refers to either the user (account owner) or to the mobile device 1, except when a distinction is explicitly made. The mobile devices include an identification module 10 for identifying the user in a mobile radio network. The identification module 10 is preferably personal, portable and can be separated from the mobile device; it is preferably a chipcard. The mobile device 1 can for example be a digital cellular mobile telephone (for example a GSM, HSCSD, GPRS, EDGE, CDMA) or a UMTS mobile telephone, or a computer (for example a PDA) or a laptop with a contactless interface (for example with a GSM, HSCSD, GPRS, EDGE, CDMA, UMTS or WLAN extension card). As a variant embodiment, the mobile device 1 could also be an ad-hoc device that can set up connections in an ad-hoc network. The identification module 10 is for example a SIM card.

The user mobile device 1 can be connected to the infrastructure 3 of a mobile radio network in order to set up voice and data connections with other devices. Infrastructure in this description and in the claims means that part of a network that is administered and operated by the operator of the network, including fixed stations, switches, home data registers, billing centers, servers for additional services etc. The infrastructure 3 of the inventive system includes a payment platform 31 that will be described in more detail further below, additional modules 300, 32, 33, 34 as well as conventional components that will not be described here.

A plurality of providers 2 that offer products, information or services to the users 1 against payment is also connected to this infrastructure. As will be explained further below, users 1 can sometimes also be providers, whilst providers 2 can also order and pay for products or services from other providers or users, so that the formal distinction between users and providers is rather theoretical. Providers can for example be traders (including online traders, traders in retail trade, ticket sellers, telecom added value service providers and/or payment machines).

Providers have provider payment modules, for example POS (Point-of-Sale) terminals or payment applications. Hereafter in the description and in the claims, the reference sign 2 will refer either to the providers or to their provider terminals, except when a distinction is explicitly made.

The users 1 and the providers 2 each have one or several money accounts with one or several finance institutes 5 that can be accessed through a plurality of payment service providers 4. Payment service providers are for example credit card companies, debit card companies, banks, postal services and other finance institutes that issue payment cards, including the mobile radio network operator. Finance institutes are for example banks, postal services and other organizations that administer third party money accounts. Each payment service provider 4 offers one or several payment services that can be subscribed to by users and providers. Each user and provider has a money account with the finance institute for each subscribed payment service. In the case of a credit or debit card service, the money account will typically be stored with the finance institute; for value cards, on the other hand, the money amount is on a money account in a user chipcard.

Mobile radio network prepaid and postpaid money accounts should be mentioned as a special case of money accounts that are bound to a card 10. These money accounts are used mainly for paying the services of the mobile radio network operator, among others for paying the voice and data connections over the network, for buying additional services, including downloading ring tunes, images, etc.

Payment service providers use the server 4 to identify respectively authenticate users for a transaction and to allow or block money transactions. Payment service providers can further establish blacklists of bad payers and unwanted users. Clearing operations, sending of bills and account statements, loading of prepaid accounts and other such operations are also performed by individual payment service providers 4 (for example by means of associated finance servers 5).

According to the payment methods to date, each user receives a physical card to prove his subscription to a payment service before a money transaction. Each money account is then bound to another card. If a user wishes to subscribe several debit, credit and/or value cards for his different payment purposes, he has to carry several payment cards and select the correct one for each payment transaction, which can prove impractical and problematic for security reasons.

In a preferred embodiment, several money accounts that can correspond to several payment services of several payment service providers 4 are bound to a common identification module 10. In a preferred embodiment, the SIM card 10, designed for identifying the user 1 in a mobile radio network, serves as multifunctional payment card bound to several money accounts. The subscription to several payment services is thus proved with the ownership of a single chipcard.

Conversely, a single money account can be bound to several identification modules. This allows for example for each member of a family or a company to have his own identification module to access a common money account.

The identification module 10 includes a memory of those areas that are made available by the mobile radio operator to the payment service providers for storing the required data. Each payment service provider thus uses a predefined memory area of the SIM card of the subscribing users in which data (for example card number, money amounts, spending limits, transaction log files, temporary or permanent service-dependent data and programs etc.) can be stored. In another preferred embodiment of the invention, these data (or part of these data) are stored in a payment platform 31 in the infrastructure of the mobile radio network. The different money accounts to which an identification card 10 is bound are thus consolidated in a virtual wallet 100 in the platform 3. A logical link between a physical card 10 and the corresponding wallet 100 of money accounts of subscribed payment services can for example occur over the IMSI (International Mobile Subscriber Identity) card number, the MSISDN (Mobile Subscriber ISDN Number) and/or the ICCID (Integrated Circuit Chip Identification).

At least certain money accounts have a fixed or variable spending limit. Money accounts that are bound to a credit card payment service usually have a periodical spending limit and often also a spending limit for each individual payment transaction. Money accounts for debit cards also often have a period spending limit; furthermore, the available balance may not be negative or may not reach a predefined lower credit limit. For most value cards, the spending limit corresponds to the available balance. For modules that are bound to several money accounts and/or to several payment services, collective spending limits may furthermore be provided. In a similar fashion, all the services and money accounts of a provider 2 can be consolidated in a wallet 200 in the payment platform 3, a logical link between a provider 2 and the corresponding wallet 200 being possible over a provider identification.

The inventive system further preferably includes an automatic determining module in order to automatically determine the ideal pair of money accounts that is used by the mobile user identification module and by the provider payment terminal for a payment transaction.

The infrastructure of the mobile radio network 3 further preferably includes a location-determining module 300 in order to determine the location of the user 1. This location can be the cell of the mobile radio network in which the user is currently located or is preferably determined with a better accuracy on the basis of triangulation methods from signals from several antennas and/or with satellite location-determining means. The determined location can be used to block or allow money accounts in certain areas, as will be described later.

A cryptoserver 32 is available in the infrastructure 3 to encrypt respectively decrypt messages with the users 1, with the providers 2 and/or with the payment service providers 4. The cryptoserver 32 can also be used to verify and if necessary confirm the authenticity, the integrity and the origin of the message.

The reference 33 illustrates the inventive fraud detection module described further below. This module combines parameters that are known within the mobile radio network (for example user location and provider location) with transaction specific parameters (for example the identity of the transaction partners or the transaction amount) in order to detect suspect transactions or cards 10. In a variant embodiment, not represented, this module is operated by the payment service providers (instead of by the mobile radio network operator).

The element 34 is a database in which the business terms of the different payment service providers are stored. Means are provided to ensure that these conditions are accepted by the users before a money account is cleared.

A proactive loading module 311 is used for automatically loading the different money accounts, in particular the value and debit accounts, with this loading being possibly initiated by different events.

Figure 2:
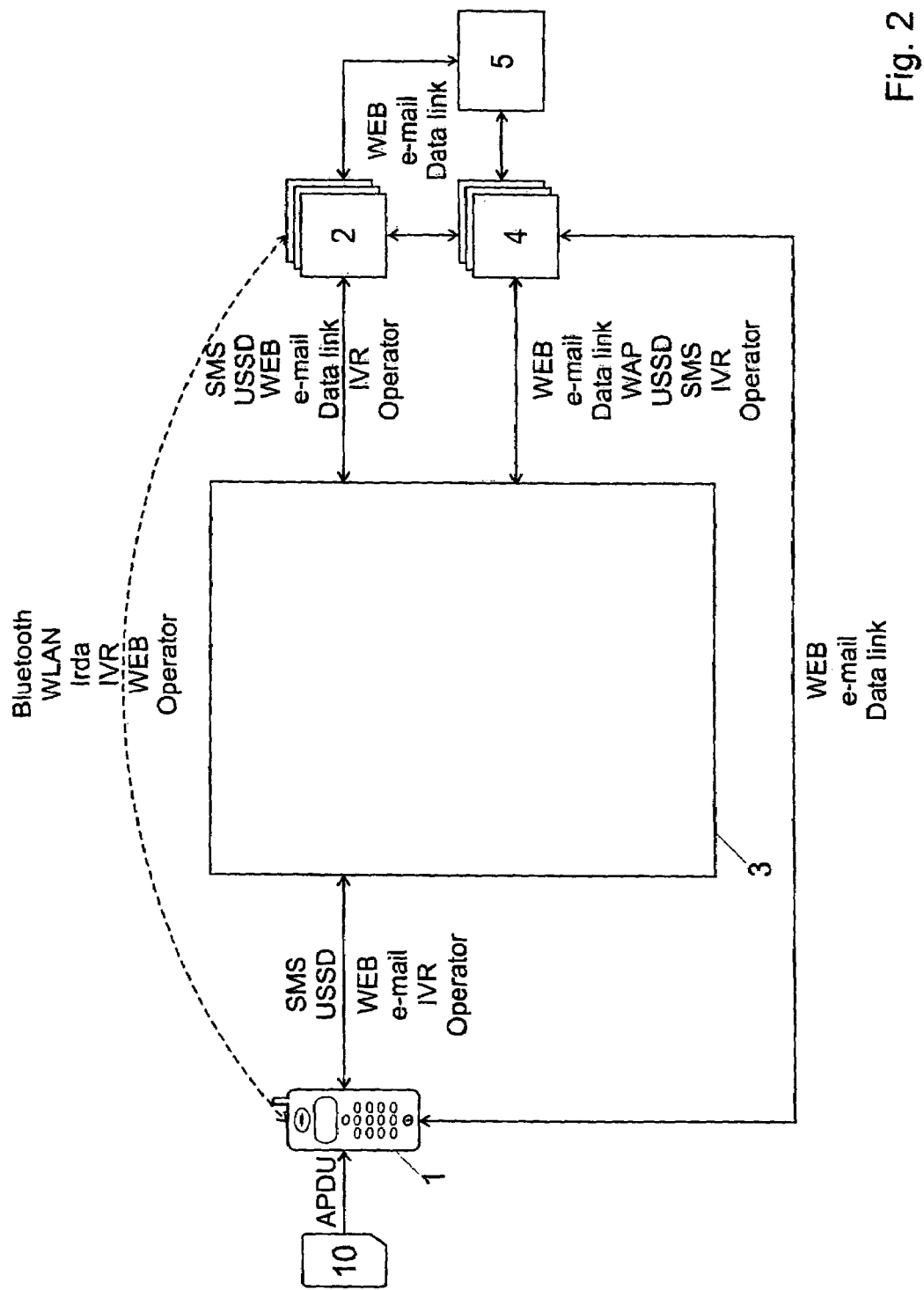
FIG. 2 shows a block diagram illustrating by way of example possible data channels between the different actors of the system.

FIG. 2 shows the possible data channels that can be used for a payment transaction between the different actors of the system.

The identification module 10 is typically accommodated as an ISO chipcard in the mobile device 1 and communicates through APDU commands with this mobile device. The mobile device is for example a GSM mobile device and can thus exchange SMS (Short Message System) or USSD (Unstructured Supplementary Service Data) or messages over routed data packets with the platform 3. As a variant embodiment, data can also be transmitted over Internet (for example with a WEB or WAP browser or per e-mail) between the mobile device 1 and the platform 3. In a variant embodiment, the platform 3 has an IVR (Interactive Voice Response) interface with which voice commands can also be transmitted over the voice channel. In another variant embodiment, data can also be communicated over a human operator (for example in a Call Center). In yet another variant embodiment, data are sent to the platform 3 over a contactless interface (for example a WLAN or Bluetooth interface).

In a similar manner, the providers 2 can also exchange data with the platform 3 over SMS, USSD, e-mail, WEB, WAP, over IVR and/or over a human operator. Other data connections (for example over routed data packets or over another data channel) can also be provided within the frame of the invention.

Depending on the payment procedure, a direct connection between the user 1 and the provider 2 can be established, for example over Bluetooth, WLAND, WEB (for example over a transaction reference), IVR, over a human operator or over an infrared interface, or by connecting the SIM card or the whole mobile station galvanically with a terminal of the provider. In this manner, at least part of the payment data can be directly transmitted fast and at no cost.

The payment service providers 4 do not need to be mobile and are thus preferably connected with the platform 3, with the users 1, (if necessary) with the providers 2 and possibly with the finance servers 5 over a fixed data link (for example over WEB, e-mail, routed data packets or over another data link). The connection between the payment platform 31 and the payment service providers 4 is preferably secured (for example over a virtual private network). Payment data between the payment platform 31 and the payment service providers can also be sent in data that concern several payment transactions. Connections with the users 1 and with the providers 2 can also be provided by facsimile or post.

As already mentioned, both the users 1 and the providers 2 can subscribe to several payment services of several payment service providers. Accordingly, identification modules 10 and terminals of the providers can be bound to several money accounts 100 respectively 200. If a user 1 wishes to perform a payment transaction with a provider 2, it is necessary to first decide with which payment service the transaction is to be performed. It is for example necessary to decide whether the transaction should be performed with a credit card, debit card or value card payment service and with which provider of this kind of services.

This decision is preferably made automatically by the determining module 310. In the represented preferred embodiment, this module is located in the payment platform 31 and is thus administered by the operator of the mobile radio network. This has the advantage that this operator can remain neutral vis-à-vis the different payment service providers and that no provider is given priority. Furthermore, the module 310 can use parameters that are determined and known within the infrastructure of the network.

The determining module preferably consists of a software and/or hardware module, for example of a software application that is executed by a server in the infrastructure 3 of the mobile radio network. The server can communicate over different data channels with the mobile devices 1, with the terminals of the provider 2 and with the payment service providers 4.

The decision to use a certain money account for a certain payment transaction can depend for example on the following parameters: transaction amount, bonus points, predetermined mobile user preferences, security factors, anonymity, user's location, identity of the mobile radio network into which the mobile user is logged, exchange rate with the different money accounts, fees for using the different money accounts, interest rates, available balance, periodical credit or debit limits, time, date and/or day of the week, log file of previous transactions, used mobile device or mobile device type, white respectively black list of providers and/or mobile users, etc.

Other parameters and priorities can be provided by the providers 2 and/or by the payment service providers.

For reasons of data protection, payment transaction data respectively payment authorization data are preferably transmitted transparently over the mobile radio network; the operator of the payment platform 3 in this case has no possibility to access the payment data of the different users or providers. In a variant embodiment, at least certain payment transaction data or payment authorization data that are destined for at least certain payment service providers are preferably made available to the payment platform with the users' or providers' consent. This has the advantage that the payment platform, with the payment data of different users, can offer providers and payment service providers additional value-added services, including:

- Sending consolidated bills to users and consolidated credit notes to providers, in which transactions that have been performed over several payment service providers are consolidated.
- Determining consolidated credit and/or debit limits to determine a maximum spending amount per time unit over several money accounts. This gives the user, the provider and the payment service provider a higher security since the entire spending amount with all money accounts of an identification module are limited.
- Fraud detection through monitoring of the user's behavior with several money accounts. This characteristic will be described in more detail further below.
- Money transactions between different money accounts that are bound to a common identification module. This allows for example a value or debit account to be loaded from another money account, for example automatically if certain criteria are met.
- Determining statistics and reports about the use of the different money accounts. This allows among others payment service providers to adapt advertising campaigns and offers better to the users' needs.
- Simultaneous blocking respectively unblocking of all money accounts (bound to a stolen or lost identification module) by the operator or the user.
- Bonus point collection programs over several money accounts of several payment service providers.
- Direct transactions between money accounts of one or several users without transaction data being sent to external payment service providers. This allows for example a user's prepaid account for using the mobile radio network to be loaded with another money account of another user.
- Use of user parameters (name, address, solvency etc.) that have been entered for a certain payment service for another subsequently subscribed payment service of another payment service provider.

In a preferred embodiment, payment transaction data respectively payment authorization data are rendered anonymous before they are made available to the payment platform. For this purpose, the user identification that is linked with certain payment data is replaced in an anonymizer with an alias that is insufficiently indicative for the network operator. In this manner, anonymous payment data are collected, used and statistically evaluated without violating data protection laws.

For detecting frauds, not only parameters of the mobile radio network 3 but also parameters of the payment service provider or providers 4 are used. In the represented example, frauds are detected with a fraud detection module 33 (for example a server with suitable software applications) in the infrastructure of the mobile radio network 3. This module 33 receives parameters of the mobile radio network (i.e. parameters that are determined within the network) directly from the payment platform 31 and/or from other hardware and software components of the network infrastructure. Parameters of the payment service providers are preferably retrieved over the corresponding data link from the servers 4 of the payment service providers. Alternatively, at least certain payment service provider parameters can be determined from the payment transaction data or payment authorization data transmitted over the payment platform 31; in this case, for reasons of data protection at least certain transaction data can be rendered anonymous.

Since the payment platform 31 and the fraud detection module 33 are centralized in this embodiment, parameters from different payment providers 4 can be combined in order to determine dubious behaviors with an even greater reliability. For example, payment transaction data with a credit card service provider and with a debit card provider can be assessed together in order to determine whether the user behavior is suspect. If a fraud or fraud attempt with one payment service provider is discovered, all money accounts that are bound to the card in question are simultaneously blocked.

We will now describe in more detail the inventive method for blocking respectively unblocking money accounts depending on the dynamically determined user location. According to the invention, before or during each payment transaction the location of one of the transaction partners (for example of the paying mobile money account owner 2) is determined and compared with a predefined list of blocked or unblocked geographical areas. The money account owner location is preferably determined with the location determining module 300 within the infrastructure of the mobile radio network 3, but could also be measured by the mobile device of the money account owner on the basis of a satellite location determining module (for example a GPS receiver). The location determining through the mobile radio network has however the advantage that the money card can also be used with conventional mobile devices that do not have a GPS receiver, and that the location information cannot be falsified.

The list of blocked or unblocked geographical areas is preferably stored in a memory area (not represented) in the payment platform 31; it could however also be located with the payment service providers 4 and/or in the identification modules 10. It would thus be possible to define several lists of areas in different memory areas that can be combined according to predefined rules to determine whether a certain money account may be used in a certain area.

The list of blocked or unblocked areas can preferably be set by the money account owner 1. As a variant (or additional) embodiment, these areas can also be defined by the payment service providers 4 and/or by the operator of the payment platform 31 and/or by the providers 2. It would also be possible that a participating mobile user—for example the parents of the money account owner—could block certain geographical areas for a money account. In a preferred embodiment, the list is edited from a remote terminal, for example over a website, a WAP page, with SMS, USSD, e-mail and/or over an IVR (Interactive Voice Response) system or over a call center.

The areas that are to be blocked or unblocked are preferably entered over a card that is reproduced on a graphical interface. In this example, the card includes a matrix in which the user can select cells that are to be blocked or unblocked. The cells can be rectangular or preferably correspond to geographical areas, for example municipality, county or national borders. The blocked and unblocked areas are preferably reproduced visually, for example with colors on a represented geographical map or as a table in which the supplied and not-supplied sections are indicated.

As a variant embodiment, the user enters an alphanumeric list of names, for example locality names, addresses, postal area codes, country names, mobile radio network identities, mobile radio network cell identifications, with which the desired areas are defined.

As previously mentioned, a single identification module can be bound to different money accounts. In this case, a different geographic blocking respectively unblocking can be bound to the different money accounts. This for example allows several value accounts that are operated in different currencies to be bound to a single identification module 10 and each value account outside the area where the corresponding currency is accepted to be blocked. This also allows a single identification module to be bound to a plurality of locally usable money accounts.

Conversely, a single money account can be bound to several identification modules, for example within a family or a company. In this case, either a common blocking or a blocking dependent on the identification module can be set.

In a preferred embodiment, different spending limits can be set in different geographical areas. This allows an account owner to limit the risk with a certain money account in an area or to completely block this money account.

An account owner wishing to use a certain money account in a blocked area will preferably be requested by the payment platform 31 to enter a password or another security secret in order to nevertheless be allowed to use the money account. The request is sent for example over SMS or USSD. This allows a user to overcome the blocking of a money account by forgoing comfort. Other security measures can be set by the account owner 1 or by the payment service provider 4 for different geographical areas.

The information about the location of the account owner can be combined with other information in order to determine whether a money account should be blocked. In a preferred embodiment, time can thus be used as an additional blocking criterion. This allows for example a user to decide that a certain money account may be used during the user's working ours only within, or in the vicinity of, the company, whilst the same account is unblocked on the week-end only close to the home. Business and company cards can be blocked outside the business and company and outside the opening hours. It is also possible to block or unblock money accounts in certain areas only for payment transactions with certain providers.

The inventive method also allows location-dependent payment transaction fees to be charged. Thus payment service providers can charge fees taking into account the risk that is bound with the dynamically determined user location. For example, higher fees can be demanded for transactions abroad or for businesses indicated as suspect.

If an account owner enters a blocked area, his blocked money account can, as an additional security measure, be automatically debited by the loading module 311 in favor of a more secure money account.

The method that is used to block a certain money account depends on the type of money account. As previously mentioned, the decision to block or unblock a money account is preferably made by a software module in the payment platform 31, but it could also be made in the identification module 10 or by a payment service provider 4. This decision is then transmitted in a message before each transaction to a blocking module (not represented) with the payment service provider 3 and/or with the money account owner 1. The blocking module receives this message and the transaction is accepted depending on its content. The mobile user is preferably informed over SMS, USSD or e-mail if a desired transaction has been blocked because of a blocking.

The inventive method allows money accounts to be opened that can be used for example only within an amusement park, an exhibition center, concert grounds, chain of restaurants, sports facilities, company premises, tourist places of interest etc. Thus the security for all parties is considerably increased. Such a fine definition of the blocked and unblocked areas however requires the mobile radio user to be dynamically determined, i.e. located on the basis not only of the mobile radio network that has been logged into.

The inventive method respectively system can be used among others to perform money transactions from user to user (P-to-P).

The invention claimed is:

1. A method for blocking and unblocking transactions with at least one money account bound to an identification module, said method comprising the steps of
   providing said identification module designed to identify a mobile radio device in a mobile radio network;
   providing said money account designed for paying services of at least one provider;
   dynamically determining the location of the mobile device;
   providing a predetermined blocked area location;
   providing a predetermined unblocked area location;
   blocking transactions with said money account if the mobile device is in said predetermined blocked area;
   unblocking transactions with said money account if the mobile device is in said predetermined unblocked area; and
   requesting said user to enter a password when said transaction is blocked because because the mobile device is in said predetermined blocked area, whereas the user is not requested to enter a password when said transaction is in said unblocked area.

2. The method of claim 1, wherein said dynamically determined location is stored in a memory area.

3. The method of claim 1, wherein said dynamically determined location is determined by the mobile device.

4. The method of claim 1, wherein a plurality of money accounts are bound to said identification module and wherein different geographic blocking and unblocking areas are bound to each one of said money accounts.

5. The method of claim 1, wherein a quantity of blocked geographical areas is stored in an electronic memory.

6. The method of claim 1, wherein a quantity of unblocked geographical areas is stored in an electronic memory.

7. The method of claim 1, wherein different spending limits can be set in different geographical areas.

8. The method of claim 1, wherein said blocked and unblocked areas are determined based on on the location combined with the time.

9. The method of claim 1, wherein the areas in which said money account is blocked and unblocked are set by said mobile user.

10. The method of claim 1, wherein the areas in which said money account is blocked and unblocked are set by the payment service provider.

11. The method of claim 1, wherein the areas in which said money account is blocked and unblocked are set by the providers.

12. The method of claim 1, wherein the areas in which said money account is blocked and unblocked are set by the operator of the payment platform.

13. The method of claim 1, wherein the areas in which said money account is blocked and unblocked are edited over a website.

14. The method of claim 1, wherein location dependent payment transaction fees are charged.

15. The method of claim 1, wherein said money account is blocked and unblocked also depending on the mobile device used with said identification module.

16. A blocking module for blocking and unblocking payment transactions, working with a location determining module to dynamically determine the location of mobile devices,
wherein said blocking module is adapted for blocking said payment transaction if the dynamically determined location of the mobile device is a predefined blocked area, and
wherein said blocking module is adapted for unblocking said payment transaction if the dynamically determined location of the mobile device is a predefined unblocked area, and
wherein said blocking module is adapted for requesting that said user enter a password when a transaction is blocked because of the area of the user, whereas an unblocked transaction does not require a password.

17. A method for blocking and unblocking transactions with at least one money account bound to an identification module, said method comprising the steps of:
providing said identification module designed to identify a mobile radio device in a mobile radio network;
providing said money account designed for paying services of at least one provider;
dynamically determining the location of the mobile device;
blocking transactions with said money account if the mobile device is in a predetermined blocked area; and
unblocking transaction with said money account if the mobile device is in a predetermined unblocked area,
wherein a plurality of said money accounts are bound to said identification module and
wherein a different geographic blocking area and unblocking are is bound to each one of said money accounts.

18. A method for blocking and unblocking transactions with at least one money account bound to an identification module, said method comprising the steps of
providing said identification module designed to identify a mobile radio device in a mobile radio network;
providing said money account designed for paying services of at least one provider;
providing a predetermined blocked area location;
providing a predetermined unblocked area location;
dynamically determining the location of the mobile device;
blocking transactions with said money account if the mobile device is in a predetermined blocked area; and
unblocking transactions with said money account if the mobile device is in said predetermined unblocked area,
wherein the areas in which said money account is blocked and unblocked are set by said mobile user.

19. The method of claim 18, wherein the areas in which said money account is blocked and unblocked are edited over a website.

20. A method for blocking and unblocking transactions with at least one money account bound to an identification module, said method comprising the steps of:
providing said identification module designed to identify a mobile radio device in a mobile radio network;
providing said money account designed for paying services of at least one provider;
dynamically determining the location of the mobile device;
blocking transactions with said money account if the mobile device is in a predetermined blocked area; and
unblocking transactions with said money account if the mobile device is in a predetermined unblocked area,
wherein different spending limits on said money account can be set for different geographical areas.

* * * * *